P. L. JORDAN.
AUTOMOBILE DRIVING GEAR.
APPLICATION FILED SEPT. 25, 1915.
1,224,750.
Patented May 1, 1917.
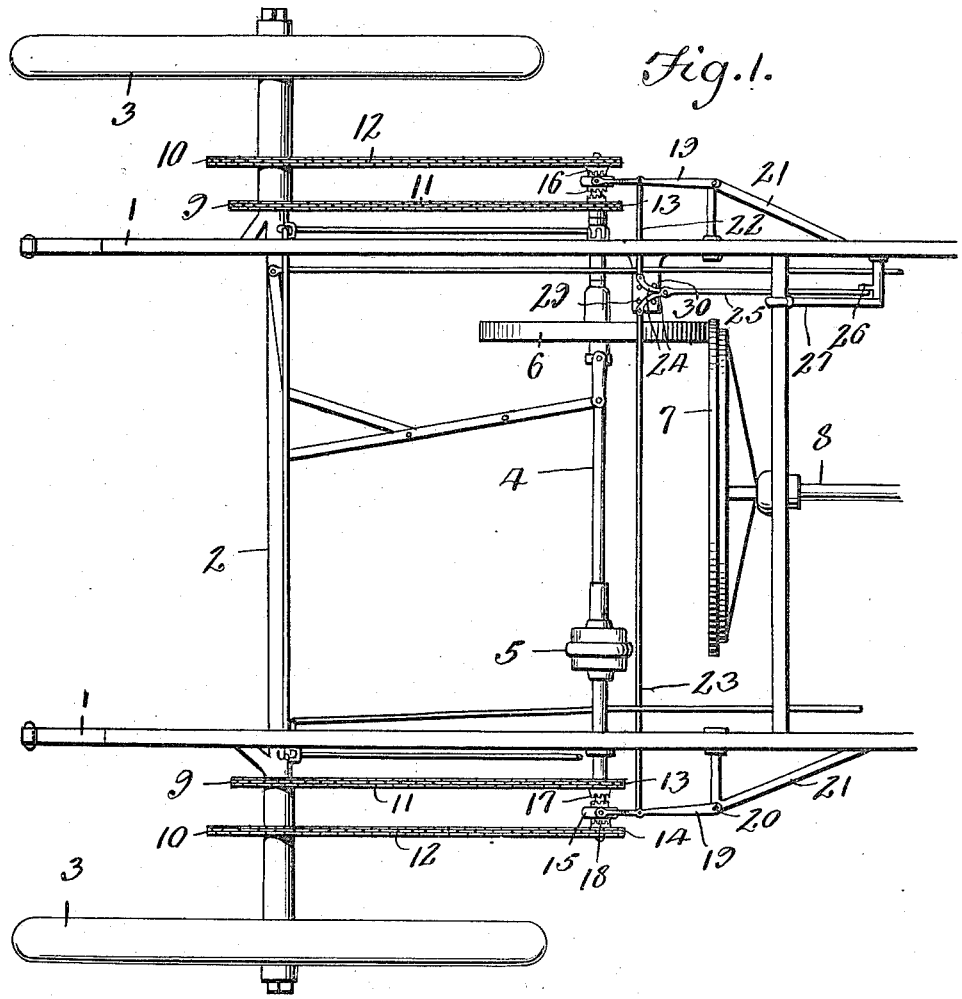
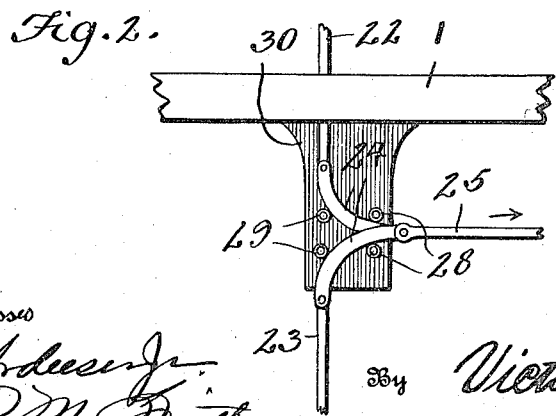

UNITED STATES PATENT OFFICE.

PERRY L. JORDAN, OF CLALLAM BAY, WASHINGTON.

AUTOMOBILE DRIVING-GEAR.

1,224,750.  Specification of Letters Patent.  Patented May 1, 1917.

Application filed September 25, 1915. Serial No. 52,638.

*To all whom it may concern:*

Be it known that I, PERRY L. JORDAN, a citizen of the United States, residing at Clallam Bay, in the county of Clallam and State of Washington, have invented new and useful Improvements in Automobile Driving-Gears, of which the following is a specification.

This invention relates to automobile driving gear, the object in view being to provide an automobile or motor truck with a simple arrangement of gearing controlled by clutch mechanism, whereby increased power may be derived from the engine for hauling heavy loads, and increased speed obtained for driving the machine at a much higher rate of speed when having a light load, the mechanism being especially adapted to truck purposes so that on the delivery trip ample power may be obtained for hauling the load and on the return trip relatively high speed may be obtained, thereby saving time in the delivery of merchandise and the like and also greatly economizing in the consumption of gasolene or other fuel when the vehicle is not carrying a load.

With the above and other objects in view, the invention consists in the novel construction, combination and arrangement of parts, as herein described, illustrated and claimed.

In the accompanying drawings:—

Figure 1 is a plan view of a sufficient portion of a motor vehicle to illustrate the application of the present invention thereto.

Fig. 2 is a detail plan view on an enlarged scale showing certain parts of the connections for operating the clutch or clutches.

Referring to the drawings 1 designates the frame of a motor vehicle, 2 the driving axle thereof and 3 the driving wheels.

A rotary counter shaft 4 is mounted in bearings on the machine frame parallel to the driving axle 2 and is shown as provided with a casing 5 in which the differential gearing is mounted. The shaft 4 is shown as having fast thereon a friction wheel 6 which is driven by a friction disk 7 fast on the driving shaft 8 to which motion is transmitted by the engine (not shown).

In carrying out the present invention, sprocket wheels 9 and 10 of different diameters are mounted on the axle 2 in fixed relation to the driving wheels 3. These sprocket wheels are arranged in spaced relation to each other as shown and receive sprocket chains 11 and 12 which extend forwardly around other sprocket wheels 13 and 14 normally loose on the countershaft 4 but adapted to be thrown into engagement therewith by means of a shiftable clutch 15 which is interposed between the wheels 13 and 14 and provided with clutch faces 16 at opposite sides thereof adapted to engage other clutch faces 17 and 18 on the inner faces of the sprocket wheels 13 and 14, respectively.

The arrangement just described is shown as duplicated at both sides of the machine in Fig. 1 and each of the clutches 15 is operated by means of a clutch shifting lever 19 having a forked end to engage a groove in the clutch 15, the lever 19 being pivotally supported at 20 by a bracket 21 fastened to the machine frame.

Extending inwardly from the levers 19 are operating rods 22 and 23, the same extending parallel to the countershaft 4 and being connected by means of curved links 24 with a connecting rod 25 which extends forwardly and is connected pivotally to an arm 26 of a manually operated lever 27 within reach of the driver of the machine. The links 24 are preferably guided by anti-friction rollers 28 and 29 the spindles or journals of which are shown as carried by a supporting bracket 30 secured to the machine frame. Parts of the machine not hereinabove particularly described may be constructed and arranged in any desired manner.

When the machine is heavily loaded, the clutches 15 are shifted by operating the manually controlled lever 27 so as to throw the sprocket wheels 14 into interlocked engagement with the countershaft 4, leaving the other sprocket wheels 13 loose. The drive is then through the sprocket chains 12 and the larger sprocket wheels 10 on the driving axle. In the return trip when the vehicle is unloaded, the clutches 15 are shifted in the opposite direction so as to throw the chains 11 and the sprocket wheels 9 into operation. This enables a speedy return trip to be made and effects a proportionate saving of gasolene or other fuel. In addition thereto, it also adapts the vehicle to climb much steeper grades in ordinary use by shifting to the chains 11 and sprocket wheels 9. In some cars only one driving chain is interposed between the countershaft 4 and the driving axle 2. In such case, it is, of course, unnecessary to duplicate the arrangement at both sides of the machine as shown in Fig. 1. While the invention is especially adapted for motor trucks or vehicles for hauling purposes, it will, of course, be seen that the gearing may also be used on touring cars and pleasure vehicles.

Having thus described my invention, I claim:—

In a motor vehicle, the combination with the driving axle and driving wheels, of a rotary countershaft parallel to said driving axle, sprocket wheels on said countershaft in spaced relation to each other and provided on their adjacent sides with clutch faces, a clutch arranged between said sprocket wheels for throwing either one of said wheels into engagement with the countershaft, means for shifting said clutch, sprocket wheels of different diameters fast on the driving axle in spaced relation to each other, sprocket chains passing around the sprocket wheels on the countershaft and driving axle, the clutch shifting means embodying a clutch shifting lever engaging said clutch, a manually controlled lever, operating connections between said manually controlled lever and clutch shifting lever, said operating connections including a rod connected with the clutch shifting lever, another rod connected with the manually operated lever, a curved link connecting said rods, and guiding means for said link.

In testimony whereof I affix my signature in presence of two witnesses.

PERRY L. JORDAN.

Witnesses:
 JOHN GUNNISS,
 GEO. SIEGFRIED.

Copies of this patent may be obtained for five cents each, by addressing the "Commissioner of Patents, Washington, D. C."